United States Patent

[11] 3,587,345

| [72] | Inventor | William M. Johnson, 1304 N. Delaware St., Rm. 101, Indianapolis, Ind. |
|---|---|---|
| [21] | Appl. No. | 802,020 |
| [22] | Filed | Feb. 25, 1969 |
| [45] | Patented | June 28, 1971 |

[54] TRANSMISSION
1 Claim, 2 Drawing Figs.

[52] U.S. Cl. .................................................. 74/688, 74/751
[51] Int. Cl. ............................................ F16h 47/08, F16h 3/74
[50] Field of Search .......................................... 74/688, 751, 794, 801

[56] References Cited
UNITED STATES PATENTS

| 2,355,876 | 8/1944 | Lazaga | 74/688 |
| 2,572,310 | 10/1951 | Brown | 74/688X |
| 2,899,844 | 8/1959 | Hattan | 74/688 |
| 3,188,888 | 6/1965 | Zink et al. | 74/801, |
| 3,224,298 | 12/1965 | Hill | 74/688 |
| 3,265,362 | 8/1966 | Moody | 74/801X |

*Primary Examiner*—Carlton R. Croyle
*Assistant Examiner*—Thomas C. Perry
*Attorney*—Woodard, Weikart, Emhardt & Naughton ABSTRACT: A fluid coupling having a planetary gear system mounted on the inner periphery of the driving element thereof. The planetary gear system includes a sun gear which receives the input. The planetary gears are coupled to a race which is an integral part of the driven element of the fluid coupling.

INVENTOR
WILLIAM M. JOHNSON

3,587,345

TRANSMISSION

BACKGROUND OF THE INVENTION

1. Field of the Invention

This invention relates to a transmission.

2. Description of the Prior Art.

Fluid couplings are widely used as power transfer means. Excluding considerations of efficiency a fluid coupling normally provides a one-to-one ratio of input torque to output torque. Consequently in the propulsion of vehicles and the like, a fluid coupling provides poor or low acceleration from low speeds or no speed up to full speed or operating speed. On alternative to such an arrangement is the well-known gear shift type of transmission. Such a gear shift type of transmission does provide better acceleration at no speed or slow speeds but manual shifting is required. Various automatic transmissions are presently available and on the market for use in automobiles and other applications. Such automatic transmissions are, however, relatively complicated and expensive to manufacture. Consequently a transmission is needed which combines the smoothness and automatic nature of a fluid coupling with the simplicity and better acceleration of a standard gear shift type of transmission.

SUMMARY OF THE INVENTION

One embodiment of this invention might include a transmission comprising a fluid coupling including a driver torous and a driven torous, a planetary gear system, including a plurality of primary planetary gears, an input shaft, said planetary gear system coupling said driver torous and said input shaft, a race mounted on said driven torous, secondary planetary gears fixed to said primary planetary gears and in meshing engagement with said race.

One object of this invention is to provide an improved transmission.

Other objects of this invention are to provide a transmission which is simple in construction; to provide a transmission which is smooth and automatic in operation, and to provide a transmission which is capable of better acceleration than a standard fluid coupling.

Related objects and advantages will become apparent as the description proceeds.

DESCRIPTION OF THE PREFERRED EMBODIMENTS

Figure 1:
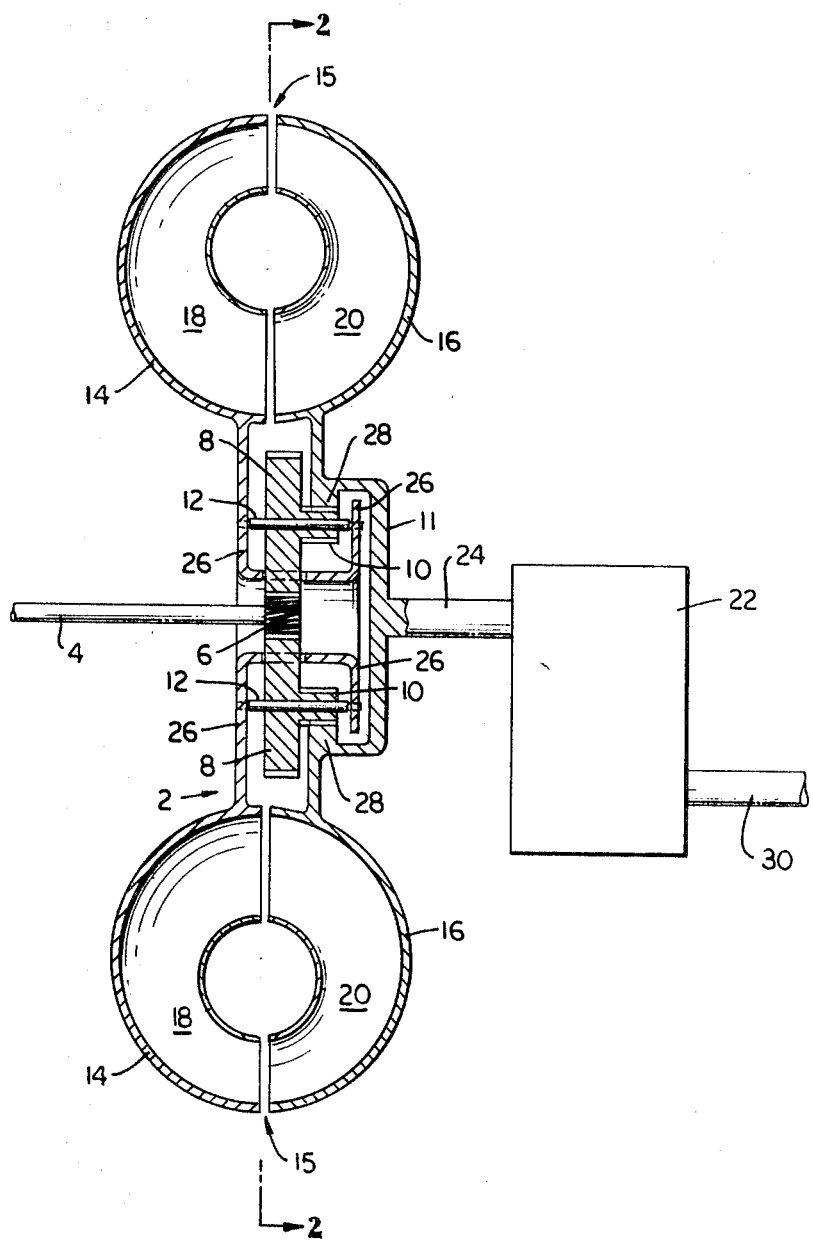
FIG. 1 is a sectional view of the transmission of this invention taken along the line 1-1 of FIG. 2 in the direction of the arrows.
Figure 2:
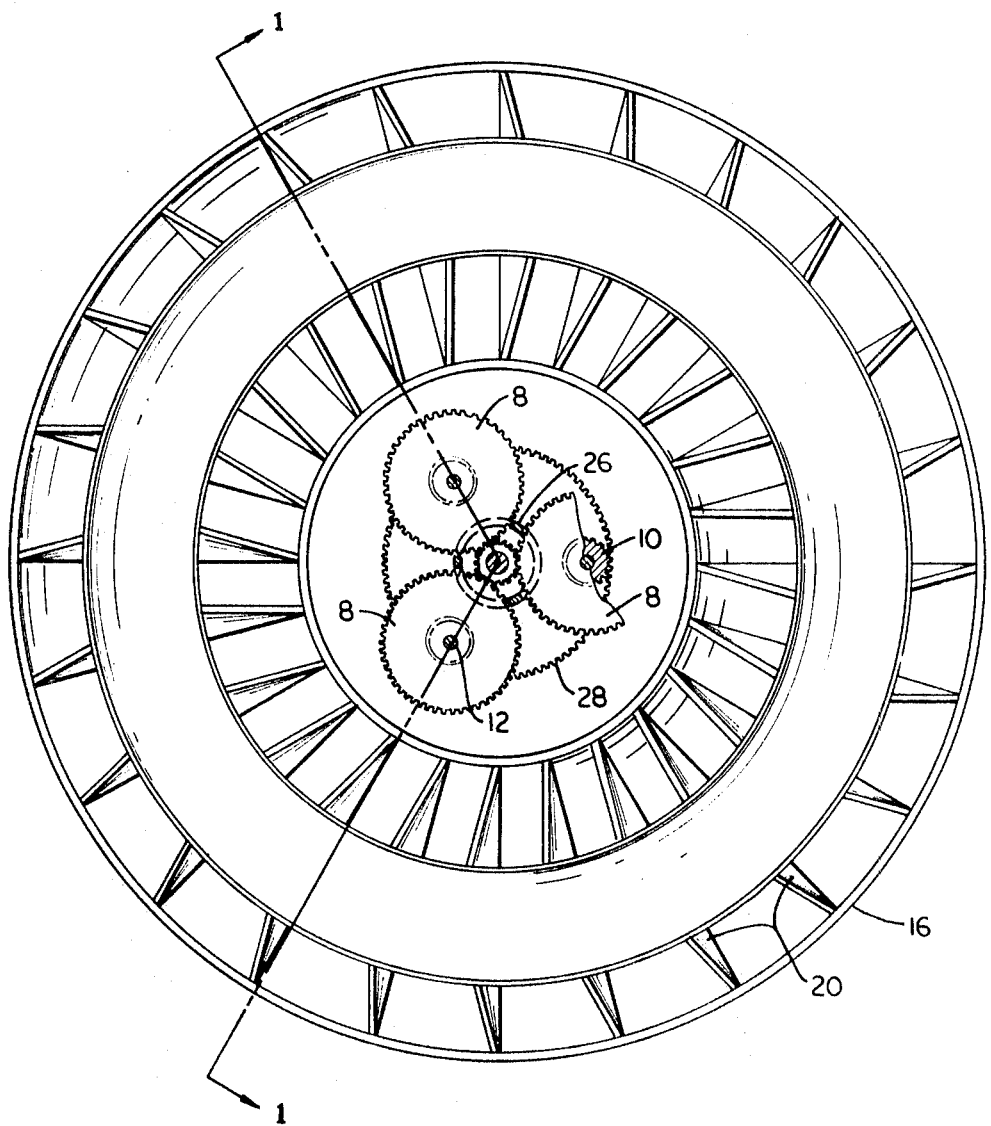
FIG. 2 is a section taken perpendicular to the axis of the transmission along the line 2-2 of FIG. 1 in the direction of the arrows.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a transmission 2 which includes an input shaft 4 fixed to a sun gear 6. Gear 6 is in meshing engagement with three primary planetary gears 8 which are adapted to be driven by the rotation of input shaft 4. The primary planetary gears 8 are integral with secondary planetary gears 10 which are in meshing engagement with a race 28. The race 28 is integral with the driven half or torous 16 of the fluid coupling 15. Each gear member 8 and 10 is positioned on a respective shaft 12 journaled in structural member 26 which is an integral part of the drive half or torous 14 of the fluid coupling. It should be understood that the driver half and driven half of the fluid coupling 15 are positioned within a suitable sealed housing in conventional fashion so as to retain the fluid in the fluid coupling.

Power is transferred to the fluid in the fluid coupling by means of vanes 18 and 20 which are attached to and are an integral part of the driver torous 14 and the driven torous 16. The driven torous 16 is further connected to a bell housing 11 which in turn is connected to an output shaft 24.

In accordance with one embodiment of this invention output shaft 24 can be connected to a forward and reverse gearing arrangement 22 for purposes of permitting the direction of rotation of output shaft 24 to be reversed. It is to be noted that forward and reverse gearing arrangement 22 is conventional in the art and is not an essential part of the invention. Power is transferred from forward and reverse gearing arrangement 22 to a driven component not shown by means of a shaft 30. In the case of the preferred embodiment of this invention wherein the transmission of this invention is utilized in an automobile shaft 30 would constitute a drive shaft running from the transmission to the rear end differential. Likewise, in this preferred embodiment input shaft 4 would be an output shaft from the internal combustion engine which is used to power the automobile.

The actual torque multiplication of the present transmission is a function of the diameter of gear 6 in relation to the diameter of the primary planetary gears 8, the relative diameter of primary planetary gears 8 to secondary planetary gears 10 and the relative diameter of secondary planetary gears 10 to the diameter of race 28 and other factors. Assuming for the moment that the output shaft 30 is held stationary and the input shaft 4 is rotated it can be seen that the shaft 4 and gear 6 will rotate at a substantially greater rotational speed than will the driver torous 14. This high relative speed ratio will result from the various gear ratios above mentioned. Because the driver torous is substantially geared down in speed relative to the shaft 4, the torque which the driver torous 14 is capable of exerting on the driven torous 16 will be theoretically multiplied by the same ratio. The theoretical torque transfer from the driver torous to the driven torous is at a one-to-one ratio. It follows that the input torque delivered to the input shaft 4 will be multiplied at output shaft 24.

Consider now the situation which occurs when the driver torous and the driven torous are fully coupled and are rotating at the same speed. The speed of the input shaft 4 is identical to the speed of the output shaft 24 and there is no torque multiplication. When the output shaft 24 is rotating but more slowly than the input shaft 4, the input shaft 4 is also rotating faster than the driver torous 14 thus providing torque multiplication but a lesser amount than when the output shaft 24 is stationary.

In this connection, it should be noted that the torque multiplication device of this invention is in fact variable and depends on the rotative speed of driver torous 14 relative to driven torous 16. That is, the actual torque multiplication achieved by the device of this invention is a function of the relative speed of the two halves of the fluid coupling 12. This is so because the planetary gears 10 rotate on the inner periphery of race 28 which is an integral part of the driven torous 16. Accordingly, when the driven torous 16 is stationary relative to driver torous 14, the torque multiplication achieved by the device of this invention is a function of the relative diameters of gears 6, 8 and 10 and race 28. In contrast, when the speed of driven torous 16 approaches that of driver torous 14 the ratio of torque transfer between input shaft 4 and output shaft 24 approaches one-to-one.

From the above description it can be seen that the present invention provides a transmission which is simple in construction yet is smooth and automatic in operation. It can also be seen that the present transmission is capable of high output torque when in the initial stages of movement. It will also be evident that the initial high torque multiplication will continually change downwardly as the rotative speed of the driven torous and driver torous of the transmission approach each other.

In accordance with the most preferred embodiment of this invention when the transmission of this invention is utilized in an automobile, an initial high torque output is achieved in the initial stages of movement. The ratio of the torque output to torque input continuously decreases as the rotative speed of the automotive wheels increases and as the relative speed of the driver torous and driven torous of the torque converter approach each other. Therefore, it is possible for an automobile using this invention to have fast acceleration as well as a one-to-one transmission coupling at operating speed making possible low engine speed.

Although a relatively sophisticated type of fluid coupling is illustrated in the drawings, various types of fluid couplings could also be used to practice the invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

I claim:

1. A transmission comprising:
an input shaft;
a sun gear fixedly fastened to said input shaft;
a plurality of primary planetary gears engaged by said sun gear at all times;
a plurality of secondary planetary gears fixed to said primary planetary gears, said primary planetary gears being larger in diameter than said sun gear and said primary planetary gears being larger in diameter than said secondary planetary gears;
a first housing separate from said input shaft having said primary planetary gears and said secondary planetary gears rotatably mounted thereon, said first housing having an opening adjacent said sun gear with said primary planetary gears projecting therethrough;
a driver torous positioned about said input shaft and being integral with said first housing;
a driven torous adjacent said driver torous;
a second housing integral with said driven torous and having an output shaft fixedly attached thereto; and,
a race integral with said second housing and being positioned on the inside wall of said second housing, said race engaging said secondary planetary gears at all times.